March 17, 1953 A. M. ZUCKERMAN 2,631,845
METHOD OF PRINTING, FOLDING, AND
CUTTING WEBS TO MAKE BOOKS
Filed July 30, 1946 4 Sheets-Sheet 1
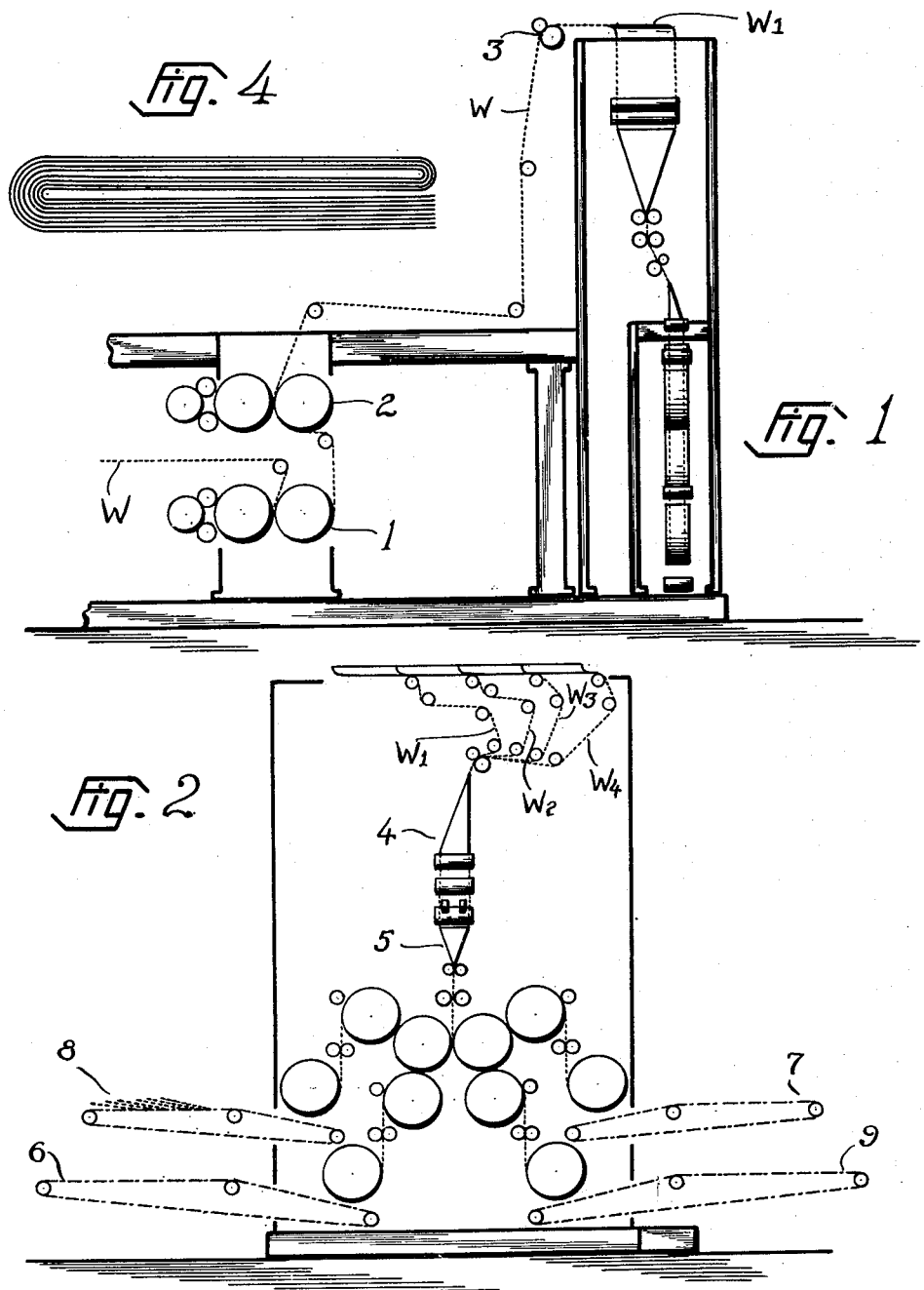
Adolph M. Zuckerman
INVENTOR
BY Sawyer & Kennedy
ATTORNEYS March 17, 1953
A. M. ZUCKERMAN
2,631,845
METHOD OF PRINTING, FOLDING, AND
CUTTING WEBS TO MAKE BOOKS
Filed July 30, 1946
4 Sheets-Sheet 2
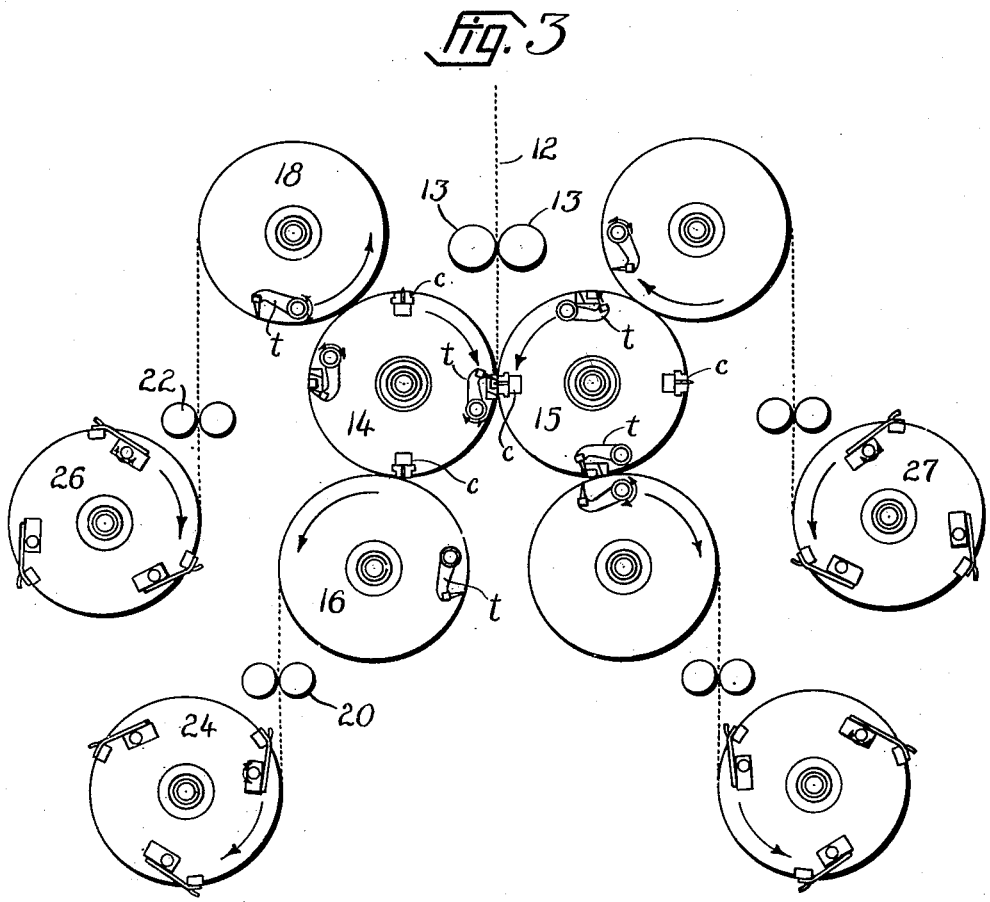
Adolph M. Zuckerman
INVENTOR.
BY
Sawyer & Kennedy
ATTORNEYS March 17, 1953 — A. M. ZUCKERMAN — 2,631,845
METHOD OF PRINTING, FOLDING, AND CUTTING WEBS TO MAKE BOOKS
Filed July 30, 1946 — 4 Sheets-Sheet 3

Fig.5

Adolph M. Zuckerman
INVENTOR

BY Sawyer & Kennedy
ATTORNEYS

March 17, 1953

A. M. ZUCKERMAN 2,631,845

METHOD OF PRINTING, FOLDING, AND CUTTING WEBS TO MAKE BOOKS

Filed July 30, 1946

Adolph M. Zuckerman
INVENTOR

BY Sawyer & Kennedy
ATTORNEYS

Patented Mar. 17, 1953

2,631,845

UNITED STATES PATENT OFFICE 2,631,845

METHOD OF PRINTING, FOLDING, AND CUTTING WEBS TO MAKE BOOKS

Adolph M. Zuckerman, New York, N. Y., assignor to R. Hoe & Co., Inc., New York, N. Y., a corporation of New York Application July 30, 1946, Serial No. 687,152

2 Claims. (Cl. 270—5)

This invention relates to improvements in the manufacture of printed books.

Books are customarily produced by assembling and binding together a number of signatures, which are separately printed and collated prior to binding. Where a signature is produced from a printed sheet, the sheet is given one or more folds parallel to a given edge and one or more folds at right angles thereto, so as to form a signature of four, eight, twelve or more pages. Where the book is manufactured from a continuous web, a flat sheet delivery may be employed, in which case the formation of the signature from the sheet does not differ from the formation of a signature from the product of a sheet-fed press. Even where the signature is formed by the folding, cut-off and delivery mechanism of a web fed press, the practice has been to imitate the method of forming signatures which is used with the product of sheet-fed presses, to the extent that the web is given one or more transverse folds, and one or more longitudinal folds, in various orders, and having suitable relation to the cut-off. Since a longitudinal fold may be produced in a web on a former and with much greater ease and speed than a transverse fold, this conventional method of production does not realize the full possibilities of formation of books from a continuous web. The present invention provides for producing book signatures from a continuous web, utilizing only longitudinal folds and eliminating transverse folds.

It is an object of the invention to provide a method of manufacturing books from a continuous web which is markedly faster and more economical than the methods heretofore used.

Another object of the invention is to provide an improved mechanism for slitting a web into ribbons and associating, folding, cutting off and delivering book signatures thus produced.

With these and other objects which will appear in the following full description in mind, the invention consists in the method of book manufacture, and in the combinations and arrangements of parts and details of construction which will now be first fully described in connection with the accompanying drawings and then be more particularly pointed out in the appended claims.

In the drawings:

Figure 1 is a schematic side view showing the delivery end of a press and the delivery mechanism associated therewith;

Figure 2 is an end view of the press of Figure 1;

Figure 3 is a detail view on an enlarged scale of the cut-off and delivery mechanism of Figure 2;

Figure 4 is a cross section view through the web as it approaches the cut-off point, and showing the folds therein;

Figure 5 is an imposition diagram showing page positions on a typical section of a printed web;

Figure 6:
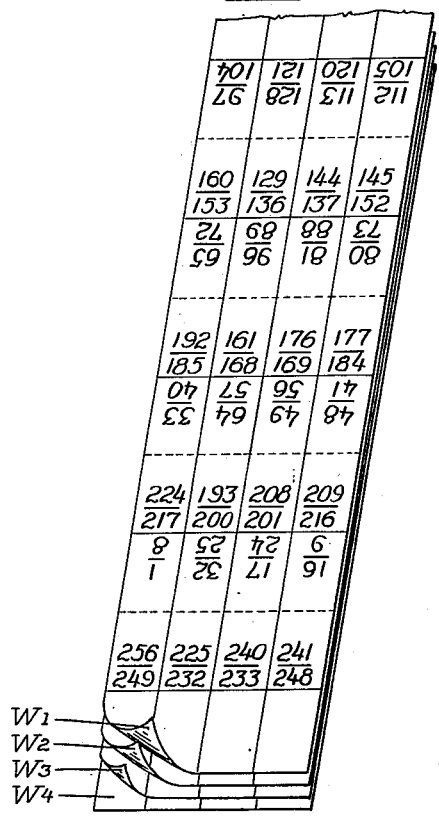
Figure 6 is a diagram showing the web after slitting and associating.

Referring to Figure 1, the web W, supplied either from other printing mechanism or from any suitable source of web supply, passes through a first printing couple 1, which prints upon the lower side, and a second printing couple 2, which prints upon the upper side. The web continues over suitable guide rolls to a slitter 3 which divides it into a plurality of narrow webs or ribbons $W_1$, $W_2$, $W_3$, and $W_4$, shown as four in number (Figure 2). These ribbons continue over suitable turner bars and guide rollers and are superposed or assembled, one on top of another. The assemblage of ribbons, comprising four layers of paper, passes over a first former 4, which folds it centrally and longitudinally, so that it is now composed of eight layers superposed one on the other, and then passes over a second former 5 which again folds it centrally and longitudinally to produce a double folded assemblage of ribbons composed of sixteen layers. Suitable slitting and associating mechanism is well known in the art, one suitable arrangement being shown in my copending application, Serial No. 578,045, filed February 15, 1945 for Printing Machines. The specific form of such elements forms no part of the present invention, and, accordingly, is not shown herein.

The thus folded assemblage of ribbons now passes to the cut-off and delivery, which cuts it into signatures which are delivered onto the delivery tapes of the four delivery stations 6, 7, 8 and 9, the successive signatures or products being delivered in rotation or cyclical order to the four stations.

The cut-off and delivery mechanism is shown more fully in Figure 3. As there shown, the twice folded web, indicated by the broken line 12, passes between the pressure rollers 13 and between a pair of cutting and taking cylinders 14 and 15. Each cutting and taking cylinder is provided with cutting elements $c$ and taking elements $t$, preferably pins arranged so that the taking elements of one cylinder cooperate with the cutting elements of the other. In the position of the figure, a cutting element $c$ of the cylinder 15 is severing the assemblage of ribbons and the leading edge of the section or signature thus being formed is being taken by the pins of a taking element $t$ of the cylinder 14. Rotation of the pair of cylinders through a quarter turn will bring a cutting element $c$ of the cylinder 14 and taking element $t$ of the cylinder 15 together, thus severing the other end of the signature on cylinder 14, and starting the next signature in its travel on the cylinder 15. Rotation through somewhat more than a quarter turn of the cylinder 14, from the position of the figure, brings the taking element carrying the signature thereon to the transfer cylinder 16, so as to bring a taking element carried by the transfer cylinder 16 together with that of the cylinder 14 and pass the signature to the transfer cylinder 16. Cylinder 16 continuing to rotate, the signature will be detached therefrom and passed through pressure rollers 20, to a delivery cylinder 24, following the course indicated by the dotted lines, and will be deposited thereby on the tapes at the delivery station 6. As will be understood, suitable guide and finger means, as well as means for giving the taking and cutting elements their necessary motions, will be provided. Such mechanisms, however, are well known in the art and in themselves form no part of the present invention. A detailed description is therefore omitted. As shown, the cutting and transfer cylinders are of the same diameter and run at the same speed, but where desired the diameters may be different and the speeds of rotation and positions of the taking elements varied accordingly.

As indicated above, the signatures following the one just discussed is taken by the cylinder 15. As will be apparent from the figure, however, a rotation of cylinders 14 and 15 through a half turn will again bring a taking element $t$ of cylinder 14 and a cutting element $c$ of cylinder 15 together so that the next signature but one will again be taken by cylinder 14. This means that a rotation of a little over three-quarters of a turn of the cylinder 14 will be required to bring the taking element carrying this signature around to the cylinder 16. Cylinder 16, however, will also have rotated about three-quarters of a turn, so that its taking element $t$ will now be on the opposite side from the cylinder 14, and this signature will continue around on the cylinder 14 until it is taken by the transfer cylinder 18. As is apparent from the figure, the taking element of cylinder 18 will then be in a position to receive the signature. Cylinder 18 will continue around and the signature carried thereby will be passed through the pressure rollers 22 to the delivery cylinder 26 for delivery to the tapes at delivery station 8, the action of the elements being the same as in the case of the signature first discussed.

The operation of the right hand side of the mechanism shown in Figure 3 is similar to that of the left hand side and hence requires no further description, beyond noting that, starting in the position of Figure 3, the first signature will be passed to delivery cylinder 24 and delivery station 6, the second signature to delivery cylinder 27 and delivery station 7; the third signature, as before mentioned, goes to delivery station 8, and the fourth to delivery station 9, the fifth signature in order again going to delivery station 6 and so on. In this way, by having the cutting and taking cylinders take alternate products and delivering the products taken thereby to alternate stations, the successive signatures will be delivered in a regular cyclical order to the four delivery stations.

The products delivered at the delivery stations are preferably double length signatures, intended to be cut apart in a later operation. The signatures delivered to each station will all be alike; and for the product herein illustrated, each delivery will receive signatures different from every other delivery.

As more fully pointed out hereinafter, a variety of impositions may be employed in the printing. However, one suitable imposition is shown diagrammatically in Figure 5. Figure 5 represents a section of a printed web, after printing, and before slitting. The printing thereon consists of a continuous reduplication of the pattern spanned by the arrows 30. Referring to this section of the web, the double pages are indicated by full line rectangles in which the single pages of which they are composed are separated one from another by broken lines. In each case, the page numbers of the typical imposition are indicated in fractional notations. For example, the rectangle containing the fraction $256/255$ shows the location of page 256, printed on the upper face of the web, and of page 255, printed on the reverse face of the web. Similarly, the inverted fraction $1/2$ shows the location of page 1, printed on the upper face of the web, and of page 2, on the reverse. The imposition shown is suitable for printing four plates around and four plates across, each plate carrying four pages, on a web which is to be slit into four ribbons $W_1$, $W_2$, $W_3$ and $W_4$ along slit lines indicated by the arrows 31, and which is ultimately to be cut into double signatures along the transverse lines indicated by the arrows 32.

After slitting along the lines 31, the four ribbons $W_1$ etc., are superposed or associated, as indicated in Figure 6, which shows a typical section of the associated multiple web structure. The notation employed is similar to that of Figure 5. For example, the fraction $256/249$ indicates the location of pages 249 to 256 and also indicates that page 256 is on the upper face of the uppermost ribbon, while page 249 is on the reverse face of the lowermost ribbon. The inverted fraction $1/8$ indicates, similarly, the location of pages 1 to 8 in their proper order, and indicates that page 1 is on the upper face of the uppermost ribbon, while page 8 is on the reverse face of the lowermost ribbon.

Figure 7:
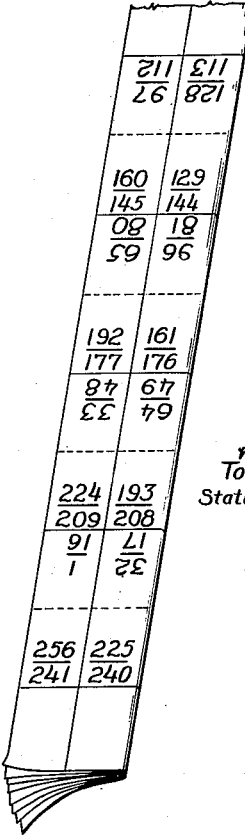
Figure 7 is a diagram showing the associated web after a single longitudinal fold.

The first central longitudinal fold produces eight thicknesses of paper, as shown in Figure 7. The notation employed has the same meaning as Figure 5. For example, the fraction $256/241$ indicates the location of pages 241 to 256 in their proper order, and that page 256 is uppermost.

Figure 8:
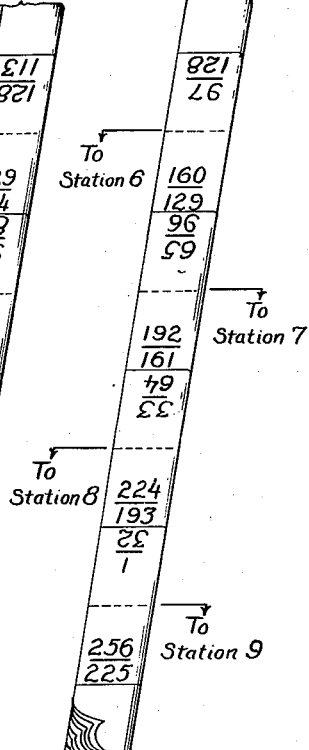
Figure 8 is a diagram showing the web after a second longitudinal fold.
Figure 9:
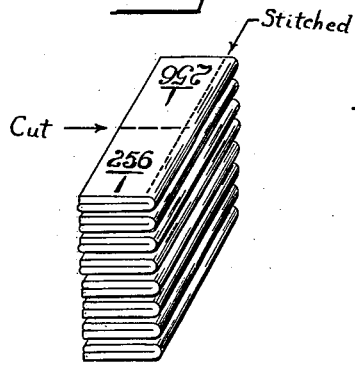
Figure 9 shows cut and collated signatures formed from the web and stitched together.
Figure 10:
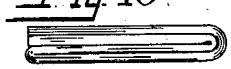
Figure 10 is an endwise view of a signature.

The second central longitudinal fold produces sixteen thicknesses of paper, with the further reduction in width shown in Figure 8. The assemblage of ribbons twice folded longitudinally next passes to the cutting cylinders 14 and 15, where it is cut along the solid lines of Figure 8, that separate the double signatures, and each of the thus severed signatures, one of which is shown in Figure 10, passes to its own delivery, as previously explained. The signatures required for forming two books are next assembled in proper order by arranging eight double signatures, as shown in Figure 9, in such order that the page numbers from the top to the bottom of the pages on one end of the pile will range from 1 to 256, while the page numbers on the other end of the pile will range from 256 on the top to 1 on the bottom. This arrangement of signatures is conveniently made by forming small stacks of signatures, each stack having a signature from each of the four delivery stations 6, 7, 8 and 9, arranged in the order stated, from top to bottom of the pile. The signatures in each of these small piles are arranged with the pages bearing numbers 129, 161, 193 and 225 uppermost and at the same end of the pile. After thusly arranging one of these small piles, a second pile of signatures similarly arranged is first turned upside down and then placed on top of the first pile, meanwhile having been turned also in a horizontal plane if necessary so that the numbers of the uppermost pages of the signatures as they are placed over the previously mentioned pages of the first pile, will be page 1 on the top signatures and pages 33, 65 and 97 in this order on the signatures below. By associating two sets of signatures in this manner, the arrangement of pages shown in Figure 9 is attained, after the signatures are fastened together by stitching, as indicated in the drawings, or by any other method, the stack may be cut in two halves along the dotted lines, to produce two of the products shown in Figure 11.

Figure 11:
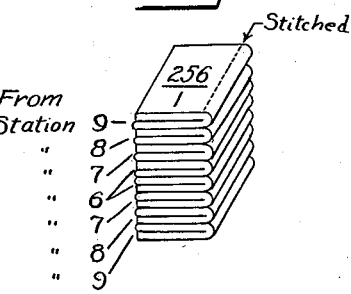
Figure 11 shows one of the books formed by cutting the product shown in Fig. 9 into halves to form two books.

It will be understood that in Figures 9 to 11, the thickness of the signatures has been greatly magnified for the sake of clearness, and that the complete product produced by the method herein disclosed may be a small book about ¼" or ⅜" thick that can be carried in the pocket without folding. It will also be understood that with suitable printing forms, two books each having 128 pages can be conveniently produced by following generally, the method herein disclosed for producing books of 256 pages, but in assembling the signatures for such smaller books, only four double signatures would be fastened together instead of eight.

While only a single imposition, providing thirty-two printed pages in each signature, has been shown, the method of the invention may be utilized for forming a wide variety of products, as desired. For example, if signatures having twenty-four pages are desired, this is readily provided for by associating three ribbons, instead of four, in the fashion indicated. The number of pages across or around the cylinder may also be varied to suit particular press mechanism and the particular product desired. Where a book having a number of pages not readily provided for by any imposition is desired, the book is manufactured by adding to the products, in the usual way, signatures comprising the necessary odd number of pages which may consist of a single sheet or any desired number of sheets.

Instead of stitching or otherwise fastening double signatures together and cutting them in halves as hereinbefore described, it is possible to produce the same products by making the final cut in the printing machine before the signatures are delivered. However, such procedure requires a much more complicated delivery mechanism and would necessitate operation of the printing machine at a considerably reduced speed, because of the greater difficulty in controlling the movements of such small products in the deliveries. By employing the means and following the method herein disclosed, it is possible to produce well printed books of certain kinds more economically than was heretofore possible.

What is claimed is:

1. The method of simultaneously making two books from a continuous web, which comprises printing the web in a plurality of widthwise sections each four pages wide and each consisting of a repeated pattern comprising a plurality of double pages aligned longitudinally of the web, slitting the printed web into a plurality of ribbons corresponding to the said printed sections of the web, associating the ribbons in face to face relation, folding the associated ribbons longitudinally midway between their edges, again folding the folded ribbons longitudinally and midway between the edges of the ribbons and the previously made fold, cutting the folded ribbons transversely into double signatures, delivering the said signatures in cyclical order to a plurality of delivery stations, taking a signature from each delivery station and assembling the signatures to form a set, association two of the said sets of signatures and securing them together in face to face relation, and then cutting the thus secured sets midway between the previously cut edges.

2. The method of making books each comprising a plurality of signatures with each signature of the book having differently printed pages, which includes printing the various pages on a web in a plurality of widthwise sections each four pages wide and each consisting of a repeated pattern comprising a plurality of double pages aligned longitudinally of the web, slitting the printed web into a plurality of ribbons corresponding to the said printed sections of the web, associating the ribbons in face to face relation, twice folding the associated ribbons longitudinally, transversely cutting the thus associated and folded ribbons into double signatures, delivering signatures having like pages to separate delivery stations, assembling sets of signatures including a signature from each delivery station, securing the signatures of each set together, and then cutting each set midway between the previously cut edges, to form two books.

ADOLPH M. ZUCKERMAN.

REFERENCES CITED

The following references are of record in the file of this patent:

UNITED STATES PATENTS

| Number | Name | Date |
| --- | --- | --- |
| 273,430 | Anthony | Mar. 6, 1883 |
| 375,125 | Clark | Dec. 20, 1887 |
| 1,586,915 | Pendergast | June 1, 1926 |
| 1,777,448 | Rader | Oct. 7, 1930 |
| 1,972,506 | Wood | Sept. 4, 1934 |
| 2,019,658 | Crafts | Nov. 5, 1935 |